United States Patent [19]

Kuroda et al.

[11] Patent Number: 5,416,710

[45] Date of Patent: May 16, 1995

[54] METHOD OF DETECTING DETERIORATION OF A THREE-WAY CATALYST OF AN INTERNAL COMBUSTION ENGINE

[75] Inventors: Shigetaka Kuroda; Yoichi Iwata; Hidekazu Kano, all of Wako, all of Japan

[73] Assignee: Honda Giken Kogyo K.K.

[21] Appl. No.: 190,252

[22] Filed: Feb. 1, 1994

Related U.S. Application Data

[63] Continuation of Ser. No. 694,831, May 2, 1991, abandoned.

[30] Foreign Application Priority Data

May 8, 1990 [JP] Japan .................................. 2-117890

[51] Int. Cl.⁶ .................................................. G06F 15/48
[52] U.S. Cl. ............................ 364/431.05; 60/274; 60/276; 60/285; 364/431.01; 364/431.04; 364/431.03
[58] Field of Search .................. 364/431.01–431.12; 123/489, 440, 589, 484, 438, 437, 492; 60/276, 285, 274, 289, 290

[56] References Cited

U.S. PATENT DOCUMENTS

| | | | |
|---|---|---|---|
| 4,072,137 | 2/1978 | Hattori et al. | 123/119 |
| 4,199,938 | 4/1980 | Nakase et al. | 60/274 |
| 4,294,212 | 10/1981 | Aoki | 123/440 |
| 4,356,797 | 11/1982 | Matsui | 123/440 |
| 4,363,209 | 12/1982 | Atago et al. | 60/274 |
| 4,364,357 | 12/1982 | Matsuoka | 123/440 |
| 4,601,273 | 7/1986 | Kitahara et al. | 123/440 |
| 4,964,272 | 10/1990 | Kayanuma | 60/274 |
| 5,052,361 | 10/1991 | Ono et al. | 123/489 |
| 5,060,473 | 10/1991 | Nakagawa | 60/277 |
| 5,069,035 | 12/1991 | Kayanuma | 60/274 |
| 5,088,281 | 2/1992 | Izutani et al. | 60/274 |
| 5,099,818 | 3/1992 | Takahashi et al. | 123/489 |
| 5,119,631 | 6/1992 | Kayanuma et al. | 60/274 |
| 5,154,055 | 10/1992 | Nakane et al. | 60/276 |

*Primary Examiner*—Kevin J. Teska
*Assistant Examiner*—Jacques H. Louis-Jacques
*Attorney, Agent, or Firm*—Arthur L. Lessler

[57] ABSTRACT

A method of detecting deterioration of a three-way catalyst of an internal combustion engine comprises the steps of (1) obtaining a first signal and a second signal based on respective signals outputted from a pre-catalyst $O_2$ sensor and a post-catalyst $O_2$ sensor at least one of when the fuel supply to the engine is increased and when the fuel supply to the engine is interrupted, (2) comparing a waveform of a signal outputted from the pre-catalyst $O_2$ sensor with a waveform of a signal outputted from the post-catalyst $O_2$ sensor, based on the first and second signals while the engine is in a predetermined stable operating condition, and (3) determining from results of the comparison whether or not the three-way catalyst is deteriorated.

16 Claims, 8 Drawing Sheets

METHOD OF DETECTING DETERIORATION OF A THREE-WAY CATALYST OF AN INTERNAL COMBUSTION ENGINE

This application is continuation of application Ser. No. 07/694,831, filed May 2, 1991, now abandoned.

BACKGROUND OF THE INVENTION

This invention relates to a method of detecting deterioration a three-way catalyst which is arranged across an exhaust pipe of an internal combustion engine for purifying exhaust gases emitted therefrom, and more particularly to a method of detecting deterioration of the three-way catalyst based on outputs from two air-fuel ratio sensors arranged in the exhaust pipe at locations upstream of the catalyst and downstream of same, respectively, at least one of which sensors is used for the air-fuel ratio feedback control.

Recently, from the viewpoint of reducing air pollution caused by exhaust gases emitted from internal combustion engines installed on automotive vehicles, more attention has come to be paid to deterioration of three-way catalysts provided in the engines for purifying the exhaust gases.

Conventionally, a method of detecting deterioration of a three-way catalyst is known from a paper SAE 900062 published by Society of Automotive Engineers in the United States of America, which is applied to an internal combustion engine including a three-way catalyst arranged in an exhaust pipe thereof, and a pre-catalyst oxygen sensor and a post-catalyst oxygen sensor (i.e. air-fuel ratio sensors respectively arranged in the exhaust pipe at locations upstream of the catalyst and downstream of same for detecting the air-fuel ratio of an air-fuel mixture supplied to the engine), and wherein deterioration of the three-way catalyst is detected by the steps of calculating areas defined between respective curves depicted by output values from the pre-catalyst and post-catalyst oxygen sensors and a predetermined reference line, calculating the difference between the two areas, and comparing the difference with a predetermined reference value.

However, according to the conventional method, no consideration is given to a difference in performance between the pre-catalyst and post-catalyst oxygen sensors, which is caused by variations between the sensors. Therefore, there can be a case where the difference in the two areas does not reach the predetermined reference value due to the difference in performance between the sensors in spite of the fact that the three-way catalyst is normally functioning, whereby it is erroneously determined that the three-way catalyst is deteriorated beyond a critical level.

SUMMARY OF THE INVENTION

It is the object of the invention to provide a method of detecting deterioration of a three-way catalyst of an internal combustion engine which is capable of accurately detecting deterioration of the three-way catalyst without being influenced by the difference in performance between the pre-catalyst and post-catalyst oxygen sensors.

To attain the above object, the present invention provides a method of detecting deterioration of a three-way catalyst of an internal combustion engine having an exhaust passage, the three-way catalyst being arranged in the exhaust passage, a first air-fuel ratio sensor arranged in the exhaust passage at a location upstream of the three-way catalyst for detecting the air-fuel ratio of exhaust gases in the exhaust passage, and a second air-fuel ratio sensor arranged in the exhaust passage at a location downstream of the three-way catalyst for detecting the air-fuel ratio of exhaust gases in the exhaust passage.

The method according to the invention is characterized by comprising the steps of:

(1) obtaining a first signal and a second signal based on respective signals outputted from the first and second air-fuel ratio sensors at least one of when the fuel supply to the engine is increased and when the fuel supply to the engine is interrupted;

(2) comparing a waveform of a signal outputted from the first air-fuel ratio sensor with a waveform of a signal outputted from the second air-fuel ratio sensor, based on the first and second signals while the engine is in a predetermined stable operating condition; and (3) determining from results of the comparison whether or not the three-way catalyst is deteriorated.

Preferably, the comparison of the step (2) comprises comparing a first area defined between the waveform of the signal outputted from the first air-fuel ratio sensor and the first signal with a second area defined between the waveform of the signal outputted from the second air-fuel ratio sensor and the second signal.

More preferably, a difference between the first area and the second area is compared with a predetermined reference value, and it is determined that the three-way catalyst is deteriorated when the difference is smaller than the predetermined reference value.

Alternatively, a ratio between the first area and the second area is compared with a predetermined reference value, and it is determined that the three-way catalyst is deteriorated when the ratio is smaller than the predetermined reference value.

Still more preferably, at least one of the first and second areas is corrected by a ratio between the first and second signals.

Preferably, the first and second signals are average values of respective output values from the first and second air-fuel ratio sensors outputted at least one of when the fuel supply to the engine is increased and when the fuel supply to the engine is interrupted.

More preferably, the predetermined stable operating condition of the engine is a condition in which a vehicle on which the engine is installed is stably cruising.

Also preferably, the comparison of the step (2) is carried out while the air-fuel ratio is controlled to a predetermined higher value and a predetermined lower value, alternately at predetermined time intervals.

In a preferred form of the invention, the method comprises the steps of:

(1) obtaining a first signal and a second signal based on respective signals outputted from the first and second air-fuel ratio sensors when the fuel supply to the engine is increased;

(2) obtaining a third signal and a fourth signal based on respective signals outputted from the first and second air-fuel ratio sensors when the fuel supply to the engine is interrupted;

(3) comparing a waveform of a signal outputted from the first air-fuel ratio sensor with a waveform of a signal outputted from the second air-fuel ratio sensor, based on the first to fourth signals while the engine is in a predetermined stable operating condition; and (4) determining from results of the comparison whether or not the three-way catalyst is deteriorated.

Preferably, the comparison of the step (3) comprises comparing a first area which is defined between the waveform of the signal outputted from the first air-fuel ratio sensor and the first and third signals with a second area which is defined between the waveform of the signal outputted from the second air-fuel ratio sensor and the second and fourth signals.

More preferably, a difference between the first area and the second area is compared with a predetermined reference value, and it is determined that the three-way catalyst is deteriorated when the difference is smaller than the predetermined reference value.

Alternatively, a ratio between the first area and the second area is compared with a predetermined reference value, and it is determined that the three-way catalyst is deteriorated when the ratio is smaller than the predetermined reference value.

Still more preferably, at least one of the first and second areas is corrected by a ratio between a differnece between the first and third signals and a difference between the second and fourth signals.

Preferably, the first and second signals are average values of respective output values from the first and second air-fuel ratio sensors outputted when the fuel supply to the engine is increased, and the third and fourth signals are average values of respective output values from the first and second air-fuel ratio sensors outputted when the fuel supply to the engine is interrupted.

More preferably, the predetermined stable operating condition of the engine is a condition in which a vehicle on which the engine is installed is stably cruising.

Also preferably, the comparison of the step (3) is carried out while the air-fuel ratio is controlled to a predetermined higher value and a predetermined lower value, alternately at predetermined time intervals.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
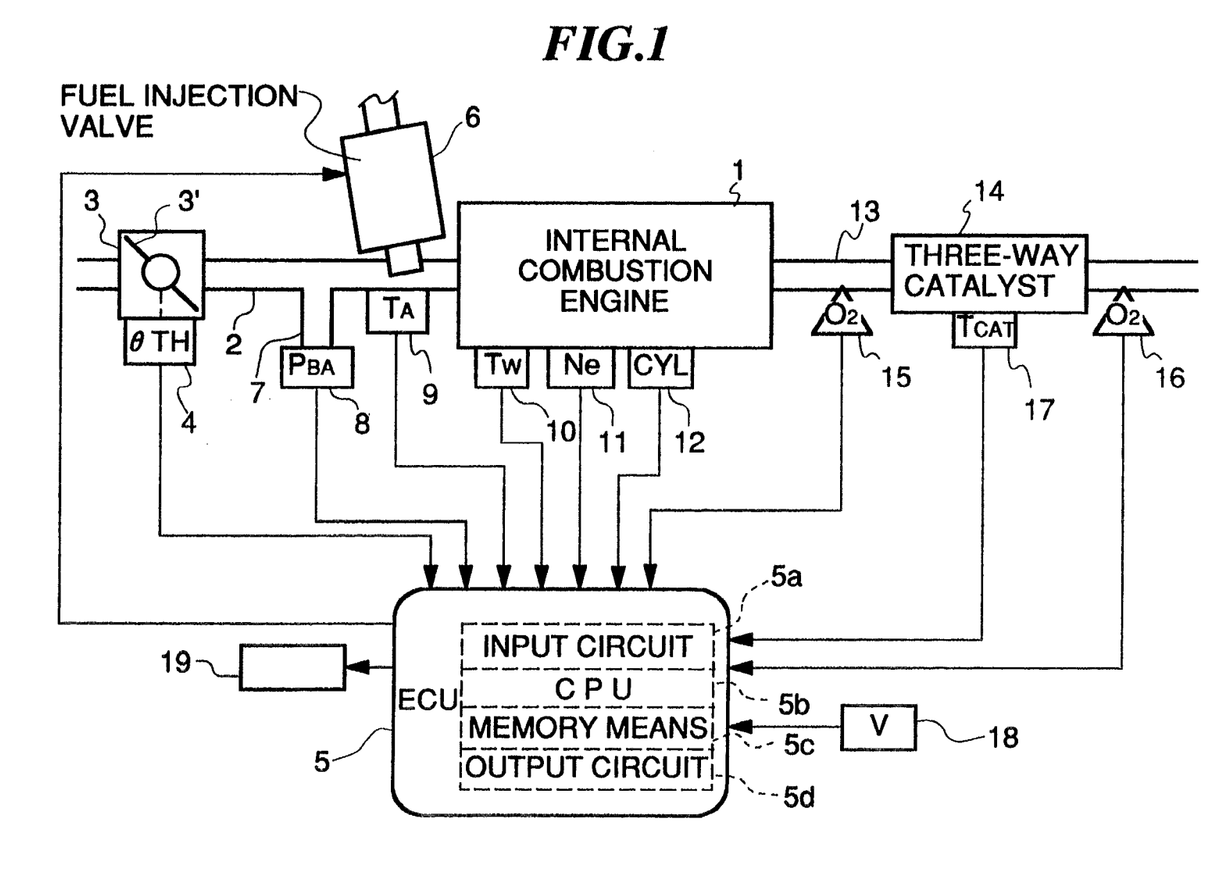
FIG. 1 is a schematic view of the whole arrangement of a fuel supply control system of an internal combustion engine to which is applied the method according to the invention.
Figure 2A:
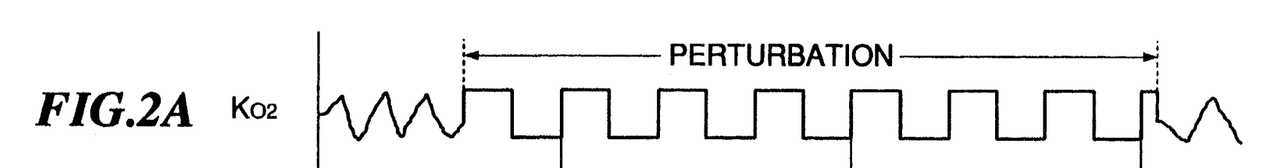
FIG. 2 is a timing chart useful in explaining the outline of an embodiment of the present invention.
Figure 2B:
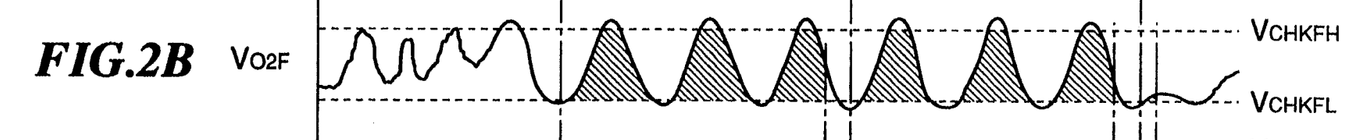
Figure 2C:
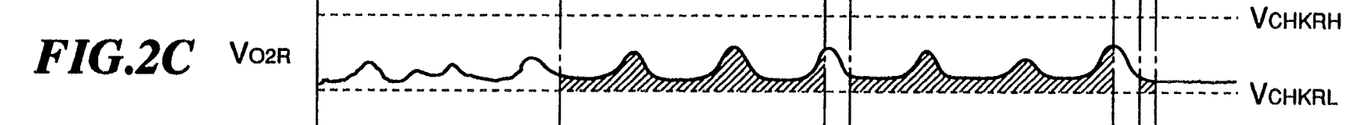
Figure 2D:
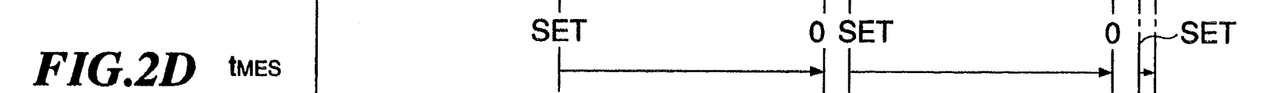
Figure 2E:
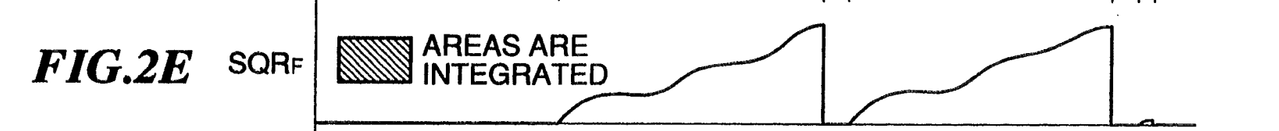
Figure 2F:
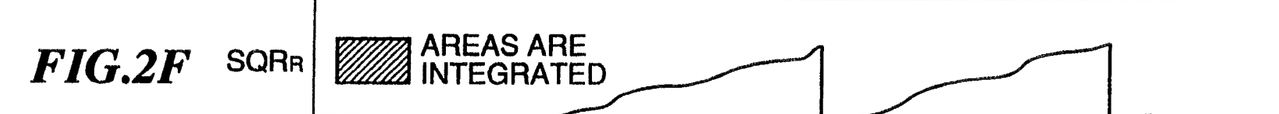

Referring first to FIG. 1, there is shown the whole arrangement of a fuel supply control system for an internal combustion engine, which is adapted to carry out the method according to the invention. In the figure, reference numeral 1 designates an internal combustion engine for automotive vehicles. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 through a conduit 7 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO, and NOx. O$_2$ sensors (a pre-catalyst O$_2$ sensor and a post-catalyst O$_2$ sensor) 15, 16 as air-fuel ratio sensors are mounted in the exhaust pipe 13 at locations upstream and downstream of the three-way catalyst 14, respectively, for sensing the concentration of oxygen present in exhaust gases emitted from the engine 1 and supplying electric signals in accordance with the output values $V_{O2F}$, $V_{O2R}$ thereof to the ECU 5. Further, a catalyst temperature ($T_{CAT}$) sensor 17 is mounted on the three-way catalyst 14 for detecting the temperature of same and supplying a signal indicative of the detected catalyst temperature $T_{CAT}$ to the ECU 5.

A vehicle speed sensor 18 is connected to the ECU 5 for detecting the vehicle speed V and supplying a signal indicative of the detected vehicle speed V to the ECU 5. Further connected to the ECU 5 is an LED (light emitting diode) 19 for raising an alarm when deterioration of the three-way catalyst 14 has been detected by the present method in a manner described in detail hereinbelow.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6 and the LED 18.

The CPU 5b operates in response to the abovementioned signals from the sensors to determine operating conditions in which the engine 1 is operating, such as an air-fuel ratio feedback control region in which the fuel supply is controlled in response to the detected oxygen concentration in the exhaust gases, and open-loop control regions including a WOT region in which fuel supply should be increased under a high load condition of the engine, and a fuel cut region, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5:

$$T_{OUT}=T_i \times K_{O2} \times K_{WOT} \times K_1 + K_2 \qquad (1)$$

where $T_i$ represents a basic value of the fuel injection period $T_{OUT}$ of the fuel injection valves 6, which is read from a Ti map set in accordance with the engine rotational speed Ne and the intake pipe absolute pressure $P_{BA}$.

$K_{O2}$ is an air-fuel ratio feedback control correction coefficient whose value is determined in response to the oxygen concentration in the exhaust gases detected by the pre-catalyst $O_2$ sensor 15, during feedback control, while it is set to respective predetermined appropriate values while the engine is in predetermined operating regions (the open-loop control regions) other than the feedback control region. The value of $K_{O2}$ may be determined in response to the output from the post-catalyst $O_2$ sensor 16. In this connection, a method of setting the value of the correction coefficient $K_{O2}$ based on the output voltage from an $O_2$ sensor is described in detail e.g. in Japanese Provisional Patent Publication (Kokai) No. 63-189638.

$K_{WOT}$ is a fuel supply-increasing coefficient which is set to a value larger than 1.0 when the engine is in the WOT region (one of the open-loop control regions).

$K_1$ and $K_2$ are other correction coefficients and correction variables, respectively, which are calculated based on various engine parameter signals to such values as to optimize characteristics of the engine such as fuel consumption and driveability depending on operating conditions of the engine.

The CPU 5b supplies through the output circuit 5d, the fuel injection valves 6 with driving signals corresponding to the calculated fuel injection period $T_{OUT}$ determined as above, over which the fuel injection valves 6 are opened.

FIG. 2 is a timing chart useful in explaining the outline of this embodiment of the present invention, which will be described in detail below with reference to the figure.

First, when the two $O_2$ sensors 15, 16 are activated and normally functioning, and at the same time the engine 1 is in a normal operation mode after the starting operation mode, there are calculated average values $V_{CHKF}$, $V_{CHKRL}$ of the respective output values $V_{O2F}$, $V_{O2R}$ from the pre-catalyst and post-catalyst $O_2$ sensors 15, 16 while the engine is operating in the fuel cut (F/C) region, and average values $V_{CHKFH}$, $V_{CHKRH}$ of same while the engine is operating in the WOT region ((b) and (c) of FIG. 2).

When the automotive vehicle has continuously been cruising for a predetermined time period or longer, and the engine is in a predetermined operating condition, the air-fuel ratio correction coefficient $K_{O2}$ is subjected to perturbation, e.g. the value of the correction coefficient $K_{O2}$ is repeatedly inverted about the average value of the correction coefficient $K_{O2}$ between ±4 to 10% thereof at time intervals of 0.5 seconds. By the perturbation carried out in the above manner, exhaust gases having a periodically changing oxygen concentration are emitted from the engine 1 and the changing oxygen concentration is detected by the $O_2$ sensors 15, 16 ((b) and (c) of FIG. 2).

Based on the thus obtained output values $V_{O2F}$, $V_{O2R}$ of the $O_2$ sensors 15, 16, and average values $V_{CHKFL}$, $V_{CHKRL}$, $V_{CHKFH}$, and $V_{CHKRH}$, an area $SQR_F$ defined between $V_{O2F}$, $V_{CHKFL}$, and $V_{CHKFH}$, and an area $SQR_R$ defined between $V_{O2R}$, $V_{CHKRL}$, and $V_{CHKRH}$, are respectively calculated ((e) and (f) of FIG. 2), which are obtained from a time point the signal indicative of the correction coefficient $K_{O2}$ rises substantially completely, over a predetermined time period $t_{MES}$ ((d) of FIG. 2). The calculation of the areas is repeated during the perturbation of the correction coefficient $K_{O2}$.

When the difference between the thus obatined areas $SQR_F$ and $SQR_R$ is smaller than a predetermined reference value, it is determined that the exhaust gas-purifying performance of the three-way catalyst 14 has been degraded.

As described above, by calculating the average values $V_{CHKFL}$, $V_{CHKRL}$ of the respective output values from the pre-catalyst and post-catalyst $O_2$ sensors 15, 16 while the engine is operating in the fuel cut region, and the average values $V_{CHKFH}$, $V_{CHKR}$ of same while the engine is operating in the WOT region, and calculating the areas $SQR_F$, $SQR_R$ based on the calculated average values, it is possible to prevent the difference in performance between the $O_2$ sensors from affecting the calculation of the difference between the areas, i.e. compensate for the influence caused by the difference in performance between the $O_2$ sensors on the calculation of the difference between the areas, whereby it is possible to accurately determine whether or not the three-way catalyst 14 is deteriorated, whithout being influenced by the differece in performance between the individual sensors 15, 16.

The embodiment of the invention will be further described in detail with reference to FIGS. 3 to 8.

Figure 3:
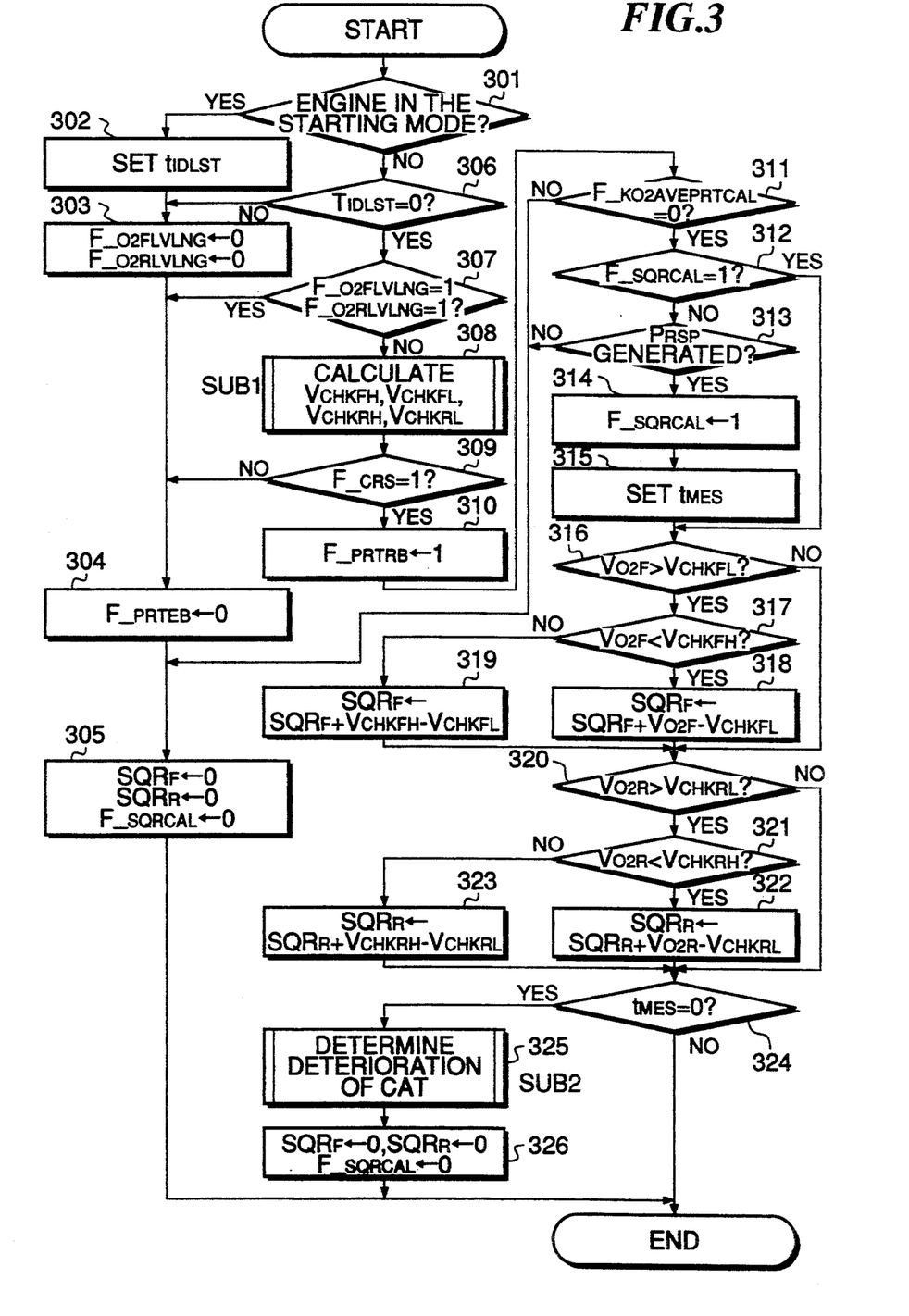
FIG. 3 is a flowchart of a control program showing the manner of detection of deterioration of a three-way catalyst, executed by a CPU 5b appearing in FIG. 1.

FIG. 3 shows a control program for detection of deterioration of the three-way catalyst 14, executed by the CPU 5b. This program is executed, e.g. upon generation of each clock pulse outputted from a timer at time intervals of 10 ms.

First, at a step 301, it is determined whether or not the engine is in the starting operation mode. If the answer to this question is affirmative (Yes), a $t_{IDLST}$ timer formed of a down counter is set at a step 302 to a predetermined time period $t_{IDLST}$ (e.g. 1 second) for measuring time having elapsed after transition from the starting operation mode of the engine to the normal operation mode of same. At a step 303, flags $F_{O2FLVLNG}$, $F_{O2RLVLNG}$, which indicate when assuming a value of 1 that the performance of the respective pre-catalyst and post-catalyst O2 sensors 15, 16 is abnormal, are each set to 0. At a step 304, a flag $F_{PRTRB}$, which indicates when assuming a value of 1 that the execution of perturbation of $K_{O2}$ is permitted, is set to 0. At a step 305, the aforementioned areas $SQR_F$, $SQR_R$ respectively obtained by output values $V_{O2F}$, $V_{O2R}$ from the pre-catalyst and post-catalyst O2 sensors 15, 16, etc. are each set to 0, and at the same time a flag $F_{SQRCAL}$, which indicates when assuming a value of 1 that calculation of the areas $SQR_F$, $SQR_R$ is being carried out, is set to 0, followed by terminating the present program.

On the other hand, if the answer to the question of the step 301 is negative (No), i.e. if the engine 1 has changed from the starting operation mode to the normal operation mode, the program proceeds to a step 306 where it is determined whether or not the count value of the $t_{IDLST}$ timer set at the step 302 is equal to 0. If the answer to this question is negative (No), the program proceeds to a step 303, whereas if the answer is affirmative (Yes), i.e. if the predetermined time period $t_{IDLST}$ has elapsed after the engine 1 entered the normal operation mode, the program proceeds to a step 307.

At the step 307, it is determined whether or not the flag $F_{O2FLVLNG}$ assumes a value of 1, the flag being set to 1 at a step 412 in FIG. 4, referred to hereinafter, when it is determined that the performance of the pre-catalyst O2 sensor is abnormal, or whether or not the flag $F_{O2RLVLNG}$ assumes a value of 1, the flag being set to 1 at a step 415 in FIG. 4, referred to hereinafter, when it is determined that the performance of the post-catalyst O2 sensor is abnormal. If the answer to this question is affirmative (Yes), i.e. if the performance of either of the O2 sensors 15, 16 is abnormal, it is judged that it is impossible to detect deterioration of the three-way catalyst 14, so that the program proceeds to the step 304 without carrying out the steps 308 et seq. On the other hand, if the answer to the question of the step 307 is negative (No), i.e. the performance of both of the O2 sensors 15, 16 is normal, the program proceeds to a step 308.

At the step 308, the average values $V_{CHKFH}$, $V_{CHKFL}$, $V_{CHKRH}$, $V_{CHKRL}$ shown in FIG. 2 are calculated. The details of the manner of this calculation is shown in a subroutine SUB 1 of FIG. 4.

First at a step 401, it is determined whether or not the O2 sensors 15, 16 have been activated. If the answer to this question is negative (No), i.e. if they have not been activated, the program proceeds to a step 402, where the pre-catalyst reference upper limit value $V_{CHKFH}$ and the post-catalyst reference upper limit value $V_{CHKRH}$ of the above average values are set to an initial value $V_{CHKINIT}$ (e.g. 1.0 V) to provide for calculation of $V_{CHKFH}$, $V_{CHKRH}$ carried out at a step 407, referred to hereinafter, and the pre-catalyst reference lower limit value $V_{CHKFL}$ and the post-catalyst reference lower limit value $V_{CHKRL}$ are set to an initial value of 0 to provide for calculation of $V_{CHKFL}$, $V_{CHKRL}$ carried out at a step 410, referred to hereinafter. Then at a step 403, a $t_{CALDLYL}$ timer formed of a down counter is set to a predetermined time period $t_{CALDLYL}$ (e.g. 2 seconds) for measuring time having elapsed after the engine 1 entered the fuel cut region, and at step 404, a $t_{CALDLYR}$ timer formed of a down counter is set to a predetermined time period $t_{CALDLYR}$ (e.g. 3 seconds) for measuring time having elapsed after the engine entered the WOT region, followed by terminating the present subroutine.

On the other hand, if the answer to the question of the step 401 is affirmative (Yes), i.e. if the O2 sensors 15, 16 have been activated, the program proceeds to a step 405, where it is determined whether or not the fuel supply-increasing coefficient $K_{WOT}$ assumes a value larger than 1.0. If the answer to this question is affirmative (Yes), i.e. if the engine 1 is in the WOT region, the program proceeds to a step 406.

At the step 406, it is determined whether or not the count value of the $t_{CALDLYR}$ timer set at the step 404 is equal to 0. If the answer to this question is negative (No), the present program is immediately terminated, whereas if the answer is affirmative (Yes), i.e. if the predetermined time period $t_{CALDYLR}$ has elapsed after the engine enetered the WOT region, so that the fuel supply to the engine 1 has become stable, the step 407 is carried out, followed by terminating the present subroutine.

At the step 407, the pre-catalyst and post-catalyst reference upper limit values $V_{CHKFH}$, $V_{CHKRH}$ are calculated based on the following equations (2) and (3):

$$V_{CHKFH}=(C_{VCHK}/100)\times V_{O2F}+[(100-C_{VCHK})/100]\times V_{CHKFH} \quad (2)$$

$$V_{CHKRH}=(C_{VCHK}/100)\times V_{O2}+[(100-C_{VCHK})/100]\times V_{CHKRH} \quad (3)$$

where $C_{VCHK}$ is an averaging coefficient which is set to a value within the range of 0 to 100, and $V_{CHKFH}$ on the right side of the equation (2) is a value of the pre-catalyst reference upper limit value which was set to the initial value $V_{CHKINIT}$ at the step 402, and has been obtained up to the last loop based on the equation (2), and similarly, $V_{CHKRH}$ on the right side of the equation (3) is a value of the post-catalyst reference upper limit value which was set to the initial value $V_{CHKINIT}$ at the step 402, and has been obtained up to the last loop based on the equation (3).

If the answer to the question of the step 405 is negative (No), the program proceeds to a step 408, where it is determined whether or not the engine 1 is in the WOT region in the present loop. If the answer to this question is negative (No), the program proceeds to the step 403, whereas if the answer is affirmative (Yes), it is determined at a step 409 whether or not the count value of the $t_{CALDLYL}$ time set at the step 403 is equal to 0. If the answer to this question is negative (No), the program proceeds to the step 404, whereas if the answer is affirmative (Yes), i.e. if the predetermined time period $t_{CALDLYL}$ has elapsed after the engine 1 entered the fuel cut region, so that the fuel supply to the engine 1 has become stable, the program proceeds to the step 410.

At the step 410, the pre-catalyst and post-catalyst reference lower limit values $V_{CHKFL}$, $V_{CHKRL}$ are calculated based on the following equations (4) and (5):

$$V_{CHKFL}=(C_{VCHK}/100)\times V_{O2F}+[(100-C_{VCHK})/100]\times V_{CHKFL} \quad (4)$$

$$V_{CHKRL}=(C_{VCHK}/100)\times V_{O2R}+[(100-C_{VCHK})/100]-V_{CHKRL} \quad (5)$$

where $C_{VCHK}$ is the same averaging coefficient applied to the above equations (2) and (3), and $V_{CHKFL}$ on the right side of the equation (4) is a value of the pre-catalyst reference lower limit value which was set to 0 at the step 402, and has been obtained up to the last loop based on the equation (4), and similarly, $V_{CHKRL}$ on the right side of the equation (5) is a value of the post-catalyst reference lower limit value which was set to 0 at the step 402, and has been obtained up to the last loop based on the equation (5).

Then at a step 411, it is determined whether or not the pre-catalyst reference lower limit value $V_{CHKFL}$ calculated as above assumes a value larger than a limit value $V_{LLMT}$ (e.g. 0.3 V). If the answer to this question is affirmative (Yes), i.e. if $V_{CHKFL} > V_{LLMT}$, it is judged that the performace of the pre-catalyst $O_2$ sensor 15 is abnormal, so that the flag F_O2FLVLNG is set to 1 at a step 412, whereas if the answer is negative (No), it is judged that the performance of the pre-catalyst $O_2$ sensor 15 is normal, so that the flag F_O2FLVLNG is set to 0 at a step 413.

Similarly at the following step 414, it is determined whether or not the post-catalyst reference lower limit value $V_{CHKRL}$ calculated at the step 410 assumes a value larger than the limit value $V_{LLMT}$. If the answer to this question is affirmative (Yes), it is judged that the performance of the post-catalyst $O_2$ sensor 16 is abnormal, so that the flag F_O2RLVLNG is set to 1 at a step 415, whereas if the answer is negative (No), it is judged tha the performance of the post-catalyst $O_2$ sensor 16 is normal, so that the flag F_O2RLVLNG is set to 0 at a step 416, followed by terminating the present subroutine, and the program proceeds to a step 309 in FIG. 3.

Figure 7:
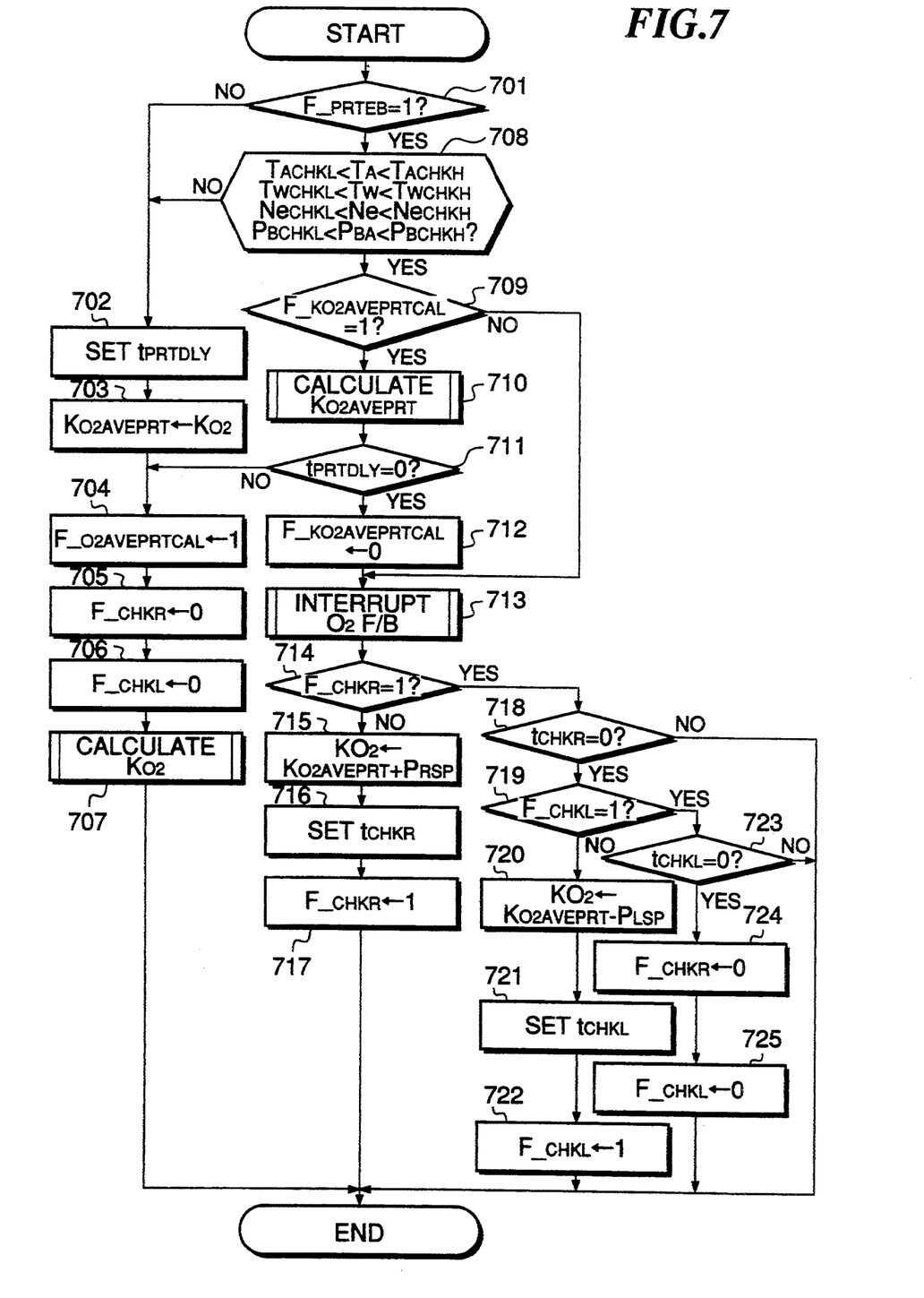
FIG. 7 is a flowchart of a control program showing the manner of carrying out perturbation of a correction coefficient $K_{O2}$.

At the step 309, it is determined whether or not a flag F_CRS which is set to a value of 1 in a control program of FIG. 8 (which will be referred to hereinafter and is carried out in parallel with the present program by other timing), when the automotive vehicle is stably cruising, assumes the value of 1. If the answer to this question is negative (No), i.e. if the vehicle is not stably cruising, it is judged that it is not suitable to detect deterioration of the three-way catalyst 14, so that the program proceeds to the step 304, whereas if the answer to the question of the step 309 is affirmative (Yes), the flag F_PRTRB, which indicates when assuming a value of 1 that the execution of perturbation of $K_{O2}$, referred to hereinafter with reference to FIG. 7, is permitted, is set to the value of 1 at a step 310.

Then at a step 311, it is determined whether or not a flag F_KO2AVEPRTCAL, which indicates when assuming a value of 0 that the perturbation of $K_{O2}$ is being carried out, assumes the value of 0. This flag is set to the value of 0 in a control program of FIG. 7 (which is referred to hereinafter and carried out in parallel with the present program by other timing) when the perturbation of $K_{O2}$ is being carried out. If the answer to this question is negative (No), i.e. if the perturbation of $K_{O2}$ is not being carried out, the program proceeds to the step 305 without carrying out detection of deterioration of the three-way catalyst 14, whereas if the answer is affirmative (Yes), the program proceeds to a step 312.

At the step 312, it is determined whether or not a flag F_SQRCAL, which indicates when assuming a value of 1 that the calculation of the areas $SQR_F$, $SQR_R$ is being carried out, assumes the value of 1. If the answer to this question is negative (No), i.e. if the calculation of the areas $SQR_F$, $SQR_R$ is carried out in the present loop for the first time, it is determined at a step 313 whether or not a special $P_R$ term $P_{RSP}$, which is used at a step 715 in FIG. 7, referred to hereinafter, has been generated and used in addition at the step 715, i.e. the signal indicative of the correction coefficient $K_{O2}$ has risen by perturbation of $K_{O2}$. If the answer to this question is negative (No), the program proceeds to the step 305 without calculating the areas, whereas if the answer is affirmative (Yes), preliminary steps 314 and 315 are carried out in order to calculate the areas $SQR_F$, $SQR_R$.

At the step 314, the flag F_SQRCAL is set to 1, and at the step 315, a $t_{MES}$ timer formed of a down counter is set to a predetermined integrating time $t_{MES}$ (e.g. 5 seconds) for calculating the areas, followed by the program proceeding to a step 316. Therefore, in the next loop, the answer to the question of the step 312 should be affirmative (Yes), so that the steps 313 to 315 are skipped over.

Figure 4:
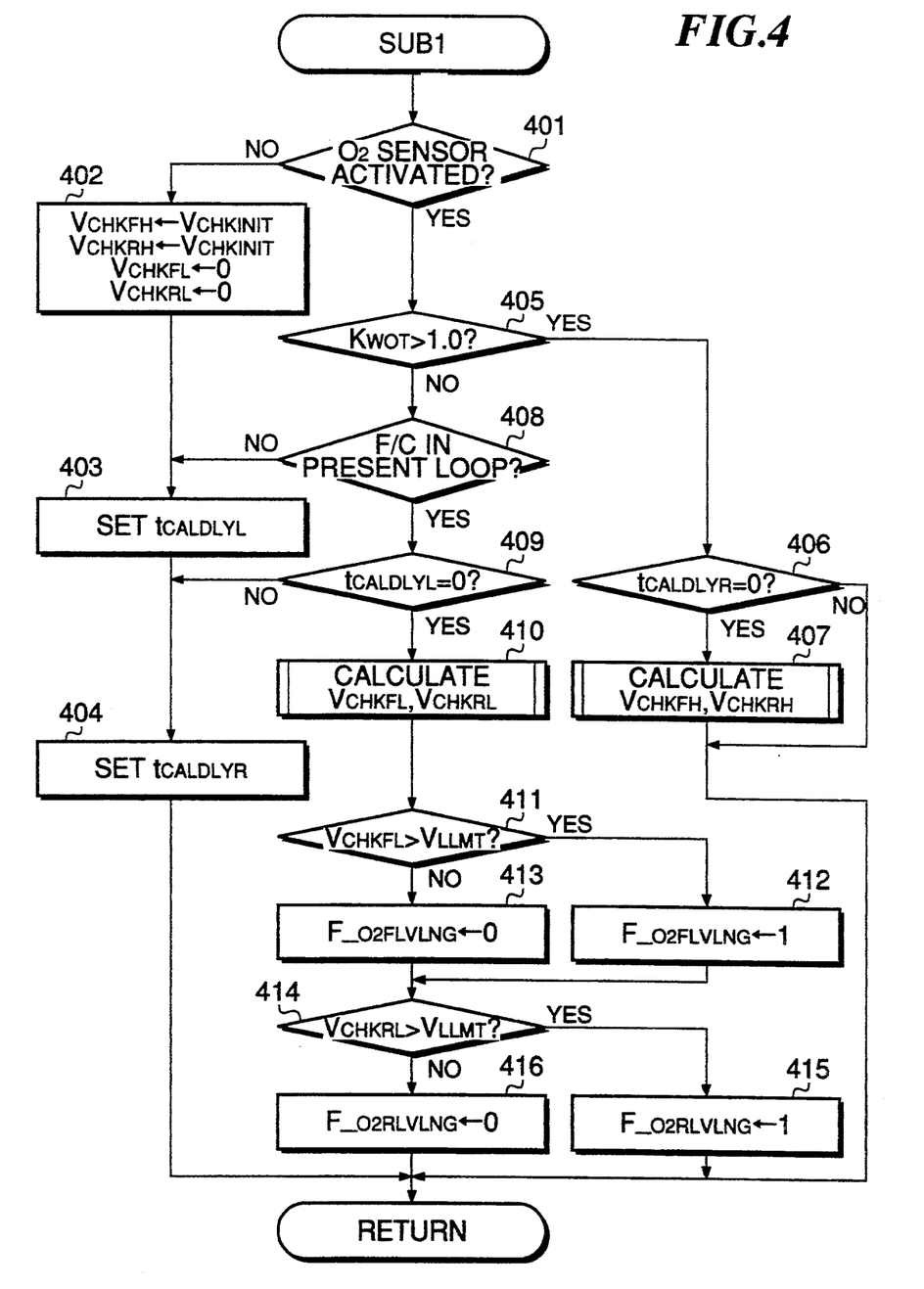
FIG. 4 is a flowchart of a subroutine showing details of a step 308 appearing in FIG. 3.

At the step 316, it is determined whether or not the output value $V_{O2F}$ from the pre-catalyst $O_2$ sensor 15 is larger than the pre-catalyst reference lower limit value $V_{CHKFL}$ calculated at the step 410 in FIG. 4. If the answer to this question is negative (No), i.e. if the output value $V_{O2F}$ is not larger than the value $V_{CHKFL}$, the program proceeds to a step 320 without calculating the pre-catalyst area $SQR_F$, whereas if the answer is affirmative (Yes), it is determined at a step 317 whether or not the output value $V_{O2F}$ is smaller than the pre-catalyst reference higher limit value $V_{CHKFH}$ calculated at the step 407 in FIG. 4. If the answer to this question is affirmative (Yes), i.e. if the output value $V_{O2F}$ from the pre-catalyst $O_2$ sensor 15 is between the upper and lower limit values $V_{CHKFH}$ and $V_{CHKFL}$, the program proceeds to a step 318, where the pre-catalyst area $SQR_F$ is calculated based on the following equation (6):

$$SQR_F=SQR_F+V_{O2F}-V_{CHKFL} \quad (6)$$

On the other hand, if the answer to the question of the step 317 is negative (No), i.e. if the output value $V_{O2F}$ from the pre-catalyst $O_2$ sensor 15 is not smaller than the lower limit value $V_{CHKFH}$, the program proceeds to a step 319, where the pre-catalyst area $SQR_F$ is calculated based on the following equation (7):

$$SQR_F=SQR_F+V_{CHKFH}-V_{CHKFL} \quad (7)$$

$SQR_F$ on the right side of the above equations (6) and (7) is a value of the pre-catalyst area which was set to an initial value of 0 at the step 305, and has been obtained up to the last loop based on the equations (6) and (7).

Similarly, at the step 320, it is determined whether or not the output value $V_{O2R}$ from the post-catalyst $O_2$ sensor 16 is larger than the post-catalyst reference lower limit value $V_{CHKRL}$. If the answer to this question is negative (No), the program proceeds to a step 324 without calculating the post-catalyst area $SQR_R$, whereas if the the answer is affirmative (Yes), it is determined at a step 321 whether or not the output value $V_{O2R}$ is smaller than the post-catalyst reference upper limit value $V_{CHKRH}$. If the answer to this question is affirmative (Yes), the program proceeds to a step 322, where the post-catalyst area $SQR_R$ is calculated based on the following equation (8):

$$SQR_R = SQR_R + V_{O2R} - V_{CHKRL} \quad (8)$$

On the other hand, if the answer to the question of the step 321 is negative (No), the program proceeds to a step 323, where the post-catalyst area $SQR_R$ is calculated based on the following equation (9):

$$SQR_R = SQR_R + V_{CHKRH} - V_{CHKRL} \quad (9)$$

$SQR_R$ on the right side of the above equations (8) and (9) is a value of the post-catalyst area which was set to an initial value of 0 at the step 305, and has been obtained up to the last loop based on the equations (8) and (9).

At the following step 324, it is determined whether or not the count value of the $t_{MES}$ timer set at the step 315 is equal to 0. If the answer to this question is negative (No), i.e. if the predetermined integrating time period $t_{MES}$ has not elapsed after the calculation of the areas $SQR_F$, $SQR_R$ started, the present program is terminated, whereas if the answer is affirmative (Yes), i.e. if the predetermined integrating time period has elapsed, the program proceeds to a step 325, where it is determined whether the performance of the three-way catalyst 14 has been deteriorated beyond a critical level.

Figure 5:
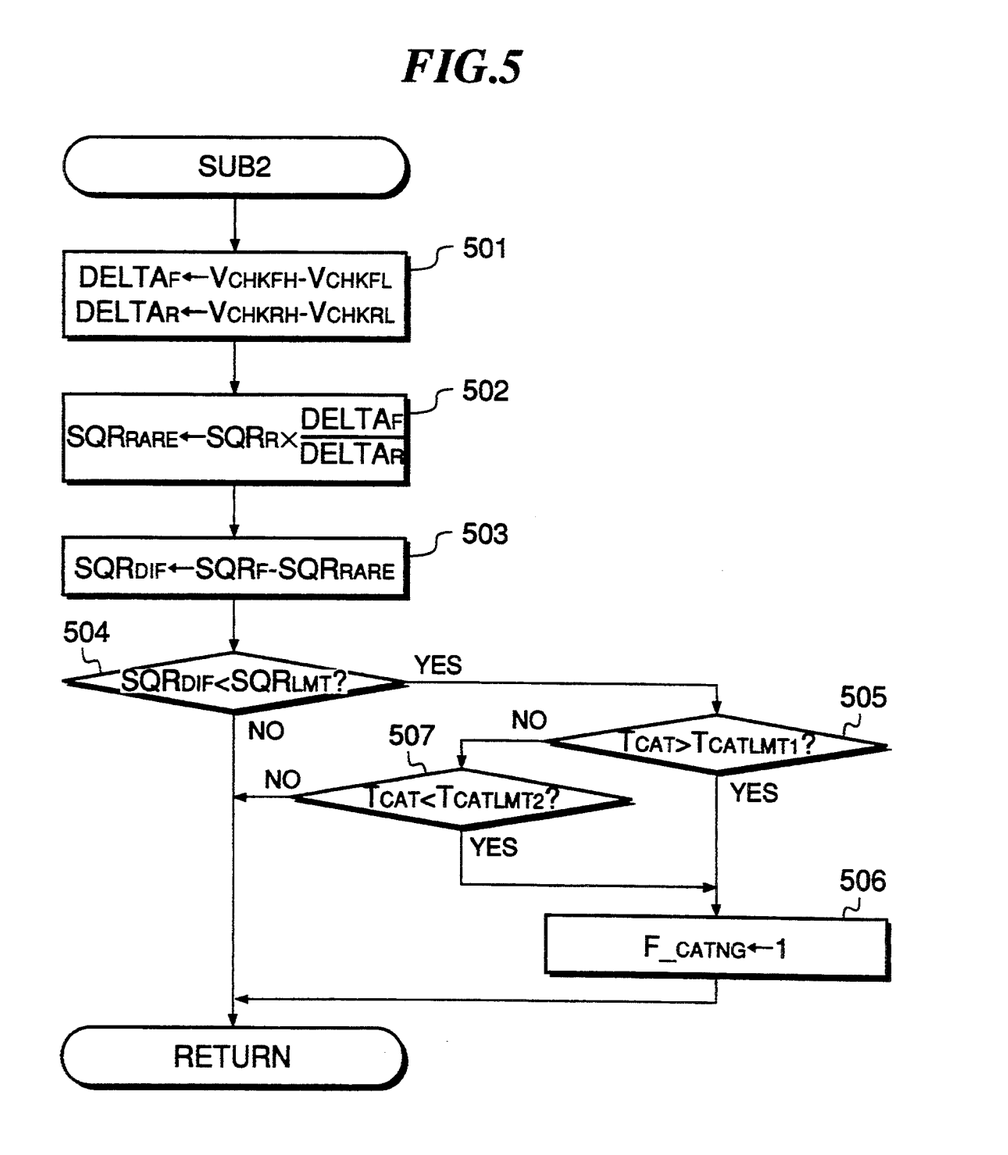
FIG. 5 is a flowchart of a subroutine showing details of a step 325 appearing in FIG. 3.
Figure 6:
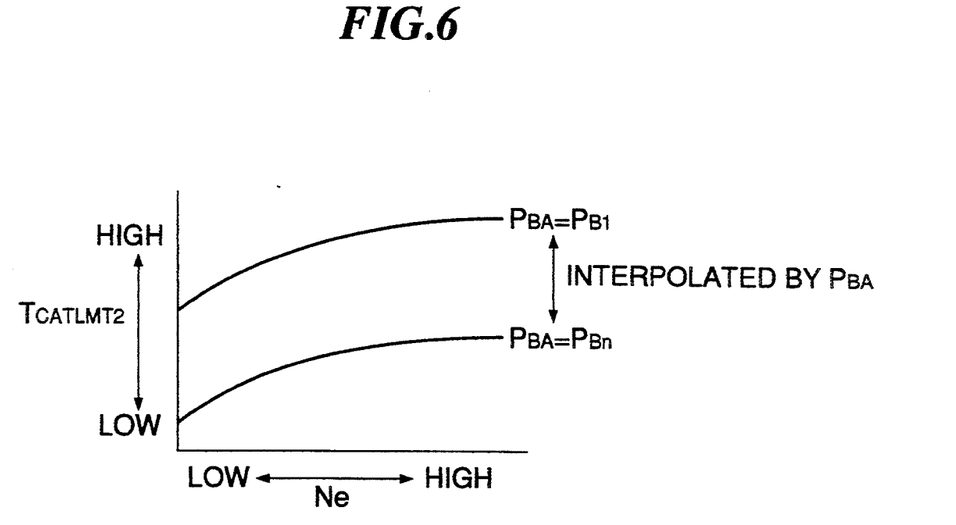
FIG. 6 is a table employed for determining a reference value $T_{CATLMT2}$ used at a step 507 appearing in FIG. 5.

The details of the step 325 are shown by a subroutine SUB 2 of FIG. 5.

First, at a step 501, a variation range $DELTA_F$ in the output value from the pre-catalyst $O_2$ sensor 15 and a variation range $DELTA_R$ in the output value from the post-catalyst $O_2$ sensor 16 are calculated based on the reference values $V_{CHKFH}$, $V_{CHKFL}$, $V_{CHKRH}$, and $V_{CHKRL}$ obtained at the steps 407 and 410 by the following equations (10) and (11):

$$DELTA_F = V_{CHKFH} - V_{CHKFL} \quad (10)$$

$$DELTA_R = V_{CHKRH} - V_{CHKRL} \quad (11)$$

At the following step 502, by the use of these variation ranges, the area $SQR_R$ obtained at the step 322 or 323 in FIG. 3 is corrected by the following equation (12) to calculate a corrected value $SQR_{RARE}$:

$$SQR_{RARE} \leftarrow SQR_R \times (DELTA_F / DELTA_R) \quad (12)$$

The thus calculated corrected value $SQR_{RARE}$ can be regarded as a value of $SQR_R$ which is free of the difference in the output value between the pre-catalyst and post-catalyst $O_2$ sensors 15, 16 due to the difference in performance between the sensors 15, 16. In the above equation (12), the post-catalyst area $SQR_R$ is corrected by the ratio of the above variation ranges. However, alternatively, the pre-catalyst area $SQR_F$ may be corrected by the reciprocal of the ratio of the variation ranges.

At the following step 503, a difference $SQR_{DIF}$ is calculated by the use of the corrected value $SQR_{RARE}$ of the post-catalyst area obtained at the step 502 and the value of the pre-catalyst area $SQR_F$ obtained at the step 319 in FIG. 3 by the following equation (13):

$$SQR_{DIF} = SQR_F - SQR_{RARE} \quad (13)$$

At a step 504, it is determined whether or not the difference $SQR_{DIF}$ is smaller than a deterioration-determining reference value $SQR_{LMT}$ (e.g. 2.0 V.sec). If the answer to this question is negative (No), i.e. if the difference $SQR_{DIF}$ is not smaller than the reference value $SQR_{LMT}$, it is judged that the performance of the three-way catalyst 14 is not degraded, followed by the present subroutine being terminated, and the program proceeds to a step 326 in FIG. 3, whereas if the answer is affirmative (Yes), the program proceeds to a step 505.

At the step 505, it is determined whether or not the termperatue $T_{CAT}$ of the three-way catalyst 14 detected by the catalyst temperature sensor 17 is higher than a first reference value $T_{CATLMT1}$. The first reference value $TCAT_{LMT1}$ is set to a temperature (e.g. 560°) which is assumed by the catalyst when the HC purifying percentage $\eta_{HC}$ of the three-way catalyst 14 is 50%. If the answer to this question is affirmative (Yes), i.e. if the answer to the question of the step 504 is affirmative in spite of the fact that the catalyst temperature $T_{CAT}$ is higher than the first reference value $T_{CATLMT1}$, it is judged that the purifying performance of the three-way catalyst 14 is abnormal, so that a flag $F_{-CATNG}$, which indicates when assuming a value of 1 the abnormality of the purifying performance of the three-way catalyst 14, is set to 1 at a step 506, whereby the LED 19 is lighted in response to this setting of the flag $F_{-CATNG}$ to the value of 1, followed by terminating the present subroutine.

On the other hand, if the answer to the question of the step 505 is negative (No), it is determined at a step 507 whether or not the catalyst temperature $T_{CAT}$ is lower than a second reference value $T_{CATLMT2}$. The second reference value $T_{CATLMT2}$ is set to a value based on a table shown in FIG. 6 in accordance with the engine rotational speed Ne and the intake pipe absolute pressure $P_{BA}$ such that the higher the engine rotational speed Ne and/or the higher the intake pipe absolute pressure $P_{BA}$, the higher the value $T_{CATLMT2}$. If the answer to this question is affirmative (Yes), i.e. if the catalyst temperature $T_{CAT}$ is lower than a value $T_{CATLMT2}$ which should be assumed by the three-way catalyst 14 under present load conditions of the engine, it is judged that the purifying performance of the three-way catalyst 14 is degraded, so that the program proceeds to the step 506, whereas if the catalyst temperature $T_{CAT}$ is so low as to be unable to attain the HC purifying percentage of 50% (the answer to the question of the step 505 is negative) and at the same time the catalyst temperature $T_{CAT}$ is equal to or higher than a value which should be assumed by the three-way catalyst 14 under present load conditions of the engine, it is judged that the performance of the three-way catalyst 14 is normal although the answer to the question of the step 504 is affirmative, so that the present subroutine is terminated without setting the flag $F_{-CATNG}$ to 1.

Then, the program proceeds to the step 326. The step 326 is identical to the step 305, and at the step 326, the caculation of the areas is initialized, followed by terminating the present program.

FIG. 7 shows a control program showing the manner of perturbation of the correction coefficient $K_{O2}$. This program is carried out upon generation of each TDC signal pulse.

First, at a step 701, it is determined whether or not the flag $F_{-PRTRB}$ is equal to 1. This flag is set to 1 at the step 310 in FIG. 3 when the predetermined time period $t_{IDLST}$ has elapsed after the engine 1 entered the normal operation mode, the pre-catalyst and post-catalyst $O_2$ sensors 15, 16 are normally functioning, and the automotive vehicle is stably cruising.

If the answer to the question of the step 701 is negative (No), a $t_{PRTDLY}$ timer formed of a down counter is set at a step 702 to a predetermined calculation time period $t_{PRTDLY}$ (e.g. 10 seconds) for calculating an average value $K_{O2AVEPRT}$ of the correction coefficient $K_{O2}$ under predetermined conditions. At a step 703, an initial value of the average value $K_{O2AVEPRT}$ is set to the latest value of the correction coefficient $K_{O2}$ obtained up to the last loop. At a step 704, a flag $F_{-KO2AVEPRTCAL}$ is set to a value of 1 to thereby indicate that the calculation of the average value $K_{O2AVEPRT}$ should be carried out in the next loop. At steps 705 and 706, a flag $F_{-CHKR}$ and a flag $F_{-CHKL}$ respecively used for enriching and leaning of the air-fuel ratio by perturbation are each set to 0. And at a step 707, the correction coefficient $K_{O2}$ in the present loop is calculated, followed by terminating the present program. The calculation of the correction coefficient $K_{O2}$ is carried out by a known method as described hereinbefore.

If the answer to the question of the step 701 is affirmative (Yes), it is determined whether or not the engine 1 is in a predetermined operating condition which is suitable for perturbation of $K_{O2}$. More specifically, it is determined whether or not the intake air temperature $T_A$ is between a predetermined upper limit value $T_{ACHKH}$ (e.g. 100° C.) and a predetermined lower limit value $T_{ACHKL}$ (e.g. 61° C.), the engine coolant temperature $T_W$ is between a predetermined upper limit value $T_{WCHKH}$ (e.g. 100° C.) and a predetermined lower limit value $T_{WCHKL}$ (e.g. 61° C.), the engine rotational speed $N_{eCHKL}$ is between a predetermined upper limit value $N_{eCHKH}$ (e.g. 3200 rpm) and a predetermined lower limit value $N_{eCHKL}$ (e.g. 2800 rpm), and the intake pipe absolute pressure $P_{BA}$ is between a predetermined upper limit value $P_{BCHKH}$ (e.g. 510 mmHg) and a predetermined lower limit value $P_{BCHKL}$ (e.g. 410 mmHg). If the answer to the question of the step 708 is negative, i.e. if any of the above conditions is not satisfied, it is judged that perturbation of $K_{O2}$ is impossible to carry out, so that the program proceeds to the step 702, whereas if the answer to the question of the step 708 is affirmative (Ye), i.e. all the above four conditions are satisfied, the program proceeds to a step 709 to calculate the average value $K_{O2AVEPRT}$ under the above predetermined conditions before carrying out perturbation of $K_{O2}$.

At the step 709, it is determined whether or not the flag $F_{-KO2AVEPRTCAL}$ is equal to 1. If the answer to this question is affirmative (Yes), the average value $K_{O2AVEPRT}$ is calculated by the following equation (14):

$$K_{O2AVEPRT}=K_{O2}\times(C_{O2AVEPRT}/100) + K_{O2AVEPRT}\times(100-C_{O2AVEPRT})/100 \quad (14)$$

where $C_{O2AVEPRT}$ is an averaging coefficient which is set to a value (e.g. 40) within the range of 0 to 100, $K_{O2}$ a value of $K_{O2}$ obtained in the last loop, and $K_{O2AVEPRT}$ on the right side of the equation (14) an average value which was set to an initial value at the step 703 and has been obtained up to the last loop by the above equation (14).

Then, at a step 711, it is determined whether or not the count value of the $t_{PRTDLY}$ timer is equal to 0. If the answer to this question is negative (No), i.e. if the calculation of the average value $K_{O2AVEPRT}$ has not been carried out over the predetermined time period $t_{PRTDLY}$, the program proceeds to the step 704, whereas if the answer is affirmative (Yes), the program proceeds to a step 712, where the flag $F_{-KO2AVEPRTCAL}$ is set to 0 to thereby indicate that the calculation of the average value $K_{O2AVEPRT}$ has been completed and perturbation of $K_{O2}$ is being carried out. Therefore, in the following loops, the answer to the question of the step 709 should be negative (No), so that the steps 710 to 712 are skipped over.

At steps 713 to 725, perturbation of $K_{O2}$ is carried out. First, at the step 713, the air-fuel ratio feedback control based on the output from the $O_2$ sensor is interrupted. Then, it is determined at a step 714 whether or not the flag $F_{-CHKR}$ which was initialized at the step 705 is equal to 1. In the first loop to carry out this step, the answer to this question is negative (No), and the program proceeds to a step 715.

At the step 715, the correction coefficient $K_{O2}$ in the present loop is calculated by the use of the average value $K_{O2AVEPRT}$ obtained at the step 715 and the special $P_R$ term $P_{RSP}$ for enriching the air-fuel mixture by the following equation (15):

$$K_{O2}=K_{O2AVEPRT}+P_{RSP} \quad (15)$$

$P_{RSP}$ is set to such a value that the resulting correction coefficient $K_{O2}$ controls the air-fuel ratio e.g. to a value of 13.23.

Then, at a step 716, a $t_{CHKR}$ timer formed of a down counter is set to a predetermined time period $t_{CHKR}$ (e.g. 0.5 seconds) over which the air-fuel ratio-enriching state set at the step 715 should continue, and at a step 717, the flag $F_{-CHKR}$ is set to 1, followed by terminating the present program.

Therefore, in the following loops, the answer to the question of the step 714 should be affirmative (Yes), so that the program proceeds to a step 718, where it is determined whether or not the count value of the $t_{CHKR}$ timer is equal to 0. If the answer to this question is negative (No), i.e. if the predetermined time period $t_{CHKR}$ has not elapsed, the present program is terminated, whereas when the answer becomes affirmative (Yes) thereafter, the program proceeds to a step 719.

At the step 719, it is determined whether or not the flag $F_{-CHKL}$ initialized at the step 706 is equal to 1. In the first loop to carry out this step, the answer becomes negative (No), so that the program proceeds to a step 720.

At the step 720, the correction coefficient $K_{O2}$ in the present loop is calculated by the use of the average value $K_{O2AVEPRT}$ obtained at the step 710 and a special $P_L$ term $P_{LSP}$ for leaning the air-fuel mixture by the following equation (16):

$$K_{O2}=K_{O2AVEPRT}-P_{LSP} \quad (16)$$

$P_{LSP}$ is set to such a value that the resulting correction coefficient $K_{O2}$ controls the air-fuel ratio e.g. to a value of 16.17.

Then, at a step 721, it is determined a $t_{CHKL}$ timer formed of a down counter is set to a predetermined time period $t_{CHKL}$ (e.g. 0.5 seconds) over which the air-fuel ratio-leaning state set at the step 720 should continue, and at a step 722, the flag $F_{-CHKL}$ is set to 1, followed by terminating the present program.

Therefore, in the following loops, the answer to the question of the step 719 should be affirmative (Yes), so that the program proceeds to a step 723, where it is determined whether or not the count value of the $t_{CHKL}$ timer is equal to 0. If the answer to this question is negative (No), i.e. if the predetermined time period $t_{CHKL}$ has not elapsed, the present program is terminated, whereas when the answer becomes affirmative (Yes) thereafter, the program proceeds to a step 724.

At the step 724, the flag $F_{-CHKR}$ is set to 0, and at the following step 725, the flag $F_{-CHKL}$ is set to 0, followed by terminating the present program. Therefore, in the following loops, the answer to the question of the step 714 should be negative (No), so that the steps 715 et seq. are carried out again.

Figure 8:
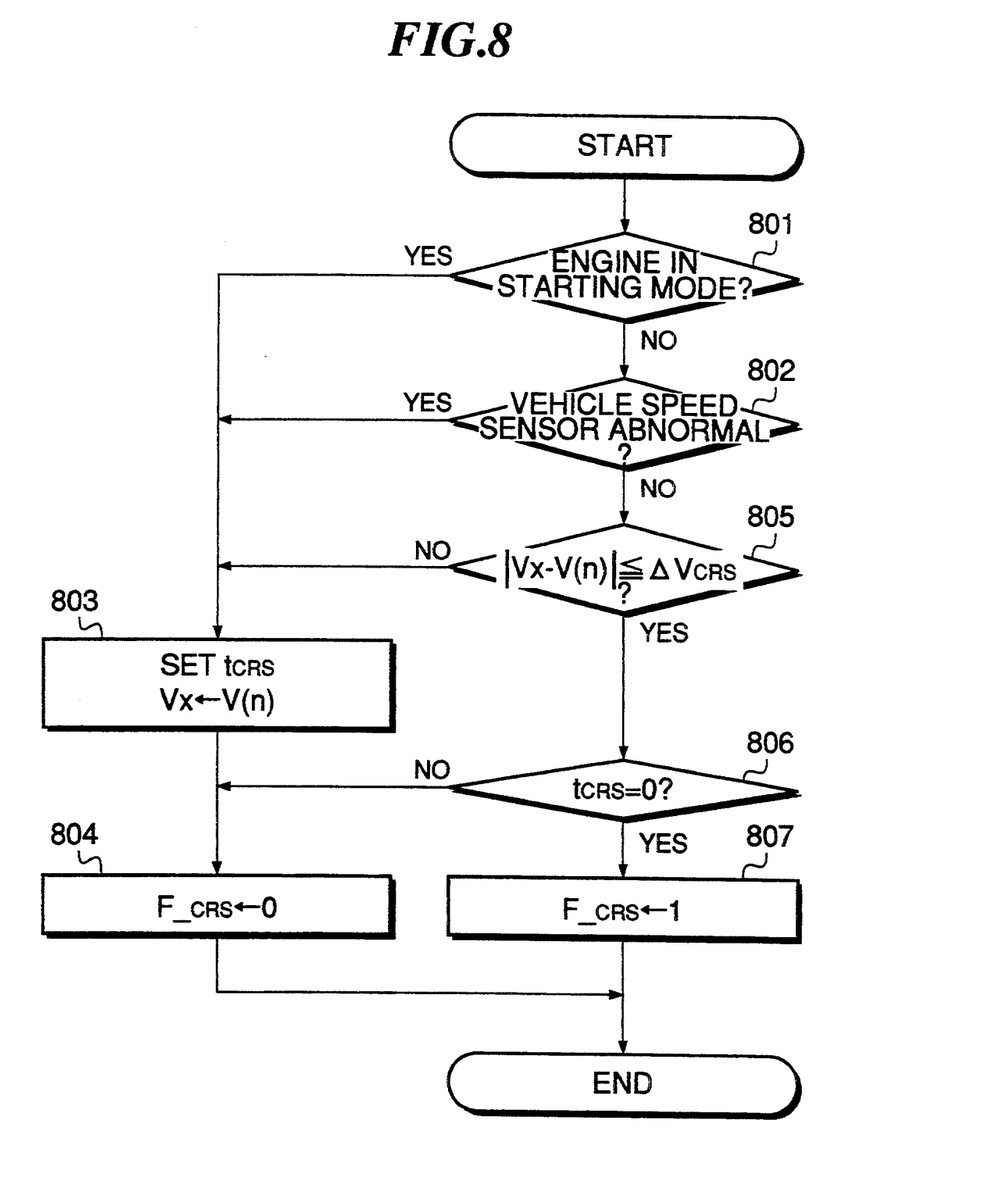
FIG. 8 is a flowchart of a control program for determining whether or not the automotive vehicle is cruising.

FIG. 8 shows a control program for determining whether the automotive vehicle is cruising. This program is carried out upon generation of each clock pulse outputted from a timer e.g. at time intervals of 20 ms.

First, at a step 801, it is determined whether or not the engine 1 is in the starting operation mode, and at a step 802, it is determined whether or not the vehicle speed sensor 18 is abnormal. If either of the answers to the questions of the steps 801 and 802 is affirmative (Yes), the program proceeds to to a step 803, where a $t_{CRS}$ timer formed of a down counter is set to a predetermined time period $t_{CRS}$ (e.g. 2 seconds) for measuring the time period over which cruising of the vehicle has continued, and a cruising-determining reference vehicle speed $V_X$ is set to a present value $V(n)$ of the vehicle speed V. Further, at a step 804, a cruising-determining flag $F_{-CRS}$ is set to 0, followed by terminating the present program.

On the other hand, if both of the answers to the questions of the steps 801 and 802 are negative (No), i.e. if the engine 1 is in the normal operation mode, and at the same time the vehicle speed sensor 18 is normally functioning, the program proceeds to a step 805, where it is determined whether or not the absolute value $|V_X - V(n)|$ of the difference between the cruising-determining reference vehicle speed $V_X$ which is set to the immediately preceding value of the vehicle speed and a present value $V(n)$ of the vehicle speed is equal to or samller than a predermined variation-determining value $\Delta V_{CRS}$ (e.g. 0.5 mile/h=0.8 km/h). If the answer to this question is negative, i.e. a change in the vehicle speed V is larger than the predetermined value $\Delta V_{CRS}$, it is judged that the vehicle is not cruising, so that the program proceeds to the step 803.

On the other hand, if the answer to the question of the step 805 is affirmative (Yes), it is determined at a step 806 whether or not the count value of the $t_{CRS}$ timer is equal to 0. If the answer to this question is negative (No), i.e. if the state in which the change is the vehicle speed V is not larger than the predetermined value $\Delta V_{CRS}$ has not continued over the predetermined time period $t_{CRS}$, the program proceeds to the step 804, and if the answer becomes affirmative (Yes) thereafter, the flag $F_{-CRS}$ is set to 1 at a step 807, followed by terminating the present program.

In the above described embodiment, the average values $V_{CHKFL}$, $V_{CHKRL}$ of the respective output values from the pre-catalyst and post-catalyst $O_2$ sensors 15, 16 are calculated while the engine is in the fuel cut region, and the average values $V_{CHKFH}$, $V_{CHKRH}$ of the respective output values from the $O_2$ sensors 15, 16 are calculated while the engine is in the WOT region, whereby the areas $SQR_F$, $SQR_R$ are calculated based on these average values. However, this is not limitative, but the average values of the respective output values from the pre-catalyst and post-catalyst $O_2$ sensors 15, 16 may be calculated only while the engine is in the WOT region or in the fuel cut region, whereby there may be calculated the areas $SQR_F$ and $SQR_R$ respectively defined between the lines determined by the respective average values and the corresponding curves determined by the respective output values $V_{O2F}$ and $V_{O2R}$ from the $O_2$ sensors 15, 16.

Further, although at the step 503 in FIG. 5, the difference in the areas is obtained, the ratio of $SQR_F$ and $SQR_R$ may be used as $SQR_{DIF}$, instead.

What is claimed is:

1. In a method of detecting deterioration of a three-way catalyst of an internal combustion engine utilizing an air-fuel mixture having an air-fuel ratio, said engine having (a) an exhaust passage, said three-way catalyst being arranged in said exhaust passage, (b) a first air-fuel ratio sensor arranged in said exhaust passage at a location upstream of said three-way catalyst for detecting an air-fuel ratio of exhaust gases in said exhaust passage, and (c) a second air-fuel ratio sensor arranged in said exhaust passage at a location downstream of said three-way catalyst for detecting an air-fuel ratio of exhaust gases in said exhaust passage, the improvement comprising the steps of:
   (1) obtaining a first signal and a second signal based on respective signals outputted from said first and second air-fuel ratio sensors when at least one of the conditions (i) when a fuel supply to said engine is increased and (ii) when a fuel supply to said engine is interrupted, is met;
   (2) correcting at least one of a waveform of a signal outputted from said first air-fuel ratio sensor and a waveform of a signal outputted from said second air-fuel ratio sensor, based on said first and second signals while said engine is in a predetermined stable operating condition;
   (3) comparing said waveform of said signal outputted from said first air-fuel ratio sensor with said waveform of said signal outputted from said second air-fuel ratio sensor, after said correction; and
   (4) determining from results of said comparison whether or not said three-way catalyst is deteriorated.

2. A method according to claim 1, wherein said waveform comparing step comprises comparing (i) a first area defined between said waveform of said signal outputted from said first air-fuel ratio sensor and said first signal with (ii) a second area defined between said waveform of said signal outputted form said second air-fuel ratio sensor and said second signal.

3. A method according to claim 2, wherein a difference between said first area and said second area is compared with a predetermined reference value, and it is determined that said three-way catalyst is deteriorated when said difference is smaller than said predetermined reference value.

4. A method according to claim 2, wherein a ratio between said first area and said second area is compared with a predetermined reference value, and it is determined that said three-way catalyst is deteriorated when said ratio is smaller than said predetermined reference value.

5. A method according to any of claims 2, 3, or 4, wherein at least one of said first and second areas is corrected by a ratio between said first and second signals.

6. A method according to claim 1 or 2, wherein said first and second signals are average values of respective output values from said first and second air-fuel ratio sensors outputted at least one of when the fuel supply to said engine is increased and when the fuel supply to said engine is interrupted.

7. A method according to any of claims 1 to 4, wherein said predetermined stable operating condition of said engine is a condition in which a vehicle on which said engine is installed is stably cruising.

8. A method according to any of claims 1 to 4, wherein said comparison of said step (2) is carried out while the air-fuel ratio is controlled to a predetermined higher value and a predetermined lower value, alternately at predetermined time intervals.

9. In a method of detecting deterioration of a three-way catalyst of an internal combustion engine utilizing an air-fuel mixture having an air-fuel ratio, said engine having (a) an exhaust passage, said three-way catalyst being arranged in said exhaust passage, (b) a first air-fuel ratio sensor arranged in said exhaust passage at a location upstream of said three-way catalyst for detecting an air-fuel ratio of exhaust gases in said exhaust passage, and (c) a second air-fuel ratio sensor arranged in said exhaust passage at a location downstream of said three-way catalyst for detecting an air-fuel ratio of exhaust gases in said exhaust passage, the improvement comprising the steps of:

(1) obtaining a first signal and a second signal based on respective signals outputted from said first and second air-fuel ratio sensors when a fuel supply to said engine is increased;

(2) obtaining a third signal and a fourth signal based on respective signals outputted from said first and second air-fuel ratio sensors when the fuel supply to said engine is interrupted;

(3) correcting at least one of a waveform of a signal outputted from said first air-fuel ratio sensor and a waveform of a signal outputted from said second air-fuel ratio sensor, based on said first to fourth signals while said engine is in a predetermined stable operating condition;

(4) comparing said waveform of said signal outputted from said first air-fuel ratio sensor with said waveform of said signal outputted from said second air-fuel ratio sensor, after said correction; and (5) determining from results of said comparison whether or not said three-way catalyst is deteriorated.

10. A method according to claim 9, wherein said comparison of said step (3) comprises comparing a first area which is defined between said waveform of said signal outputted from said first air-fuel ratio sensor and said first and third signals with a second area which is defined between said waveform of said signal outputted from said second air-fuel ratio sensor and said second and fourth signals.

11. A method according to claim 10, wherein a difference between said first area and said second area is compared with a predetermined reference value, and it is determined that said three-way catalyst is deteriorated when said difference is smaller than said predetermined reference value.

12. A method according to claim 10, wherein a ratio between said first area and said second area is compared with a predetermined reference value, and it is determined that said three-way catalyst is deteriorated when said ratio is smaller than said predetermined reference value.

13. A method according to any of claims 10, 11, or 12, wherein at least one of said first and second areas is corrected by a ratio between a differnece between said first and third signals and a difference between said second and fourth signals.

14. A method according to claim 9 or 10, wherein said first and second signals are average values of respective output values from said first and second air-fuel ratio sensors outputted when the fuel supply to said engine is increased, and said third and fourth signals are average values of respective output values from said first and second air-fuel ratio sensors outputted when the fuel supply to said engine is interrupted.

15. A method according to any of claims 9 to 12, wherein said predetermined stable operating condition of said engine is a condition in which a vehicle on which said engine is installed is stably cruising.

16. A method according to any of claims 9 to 12, wherein said comparison of said step (3) is carried out while the air-fuel ratio is controlled to a predetermined higher value and a predetermined lower value, alternately at predetermined time intervals.

* * * * *